United States Patent [19]

Nicolas et al.

[11] Patent Number: 5,453,797
[45] Date of Patent: Sep. 26, 1995

[54] METHOD AND APPARATUS FOR DECODING BROADCAST DIGITAL HDTV IN THE PRESENCE OF QUASI-CYCLOSTATIONARY INTERFERENCE

[75] Inventors: Julien J. Nicolas, Cambridge; Jae S. Lim, Winchester, both of Mass.

[73] Assignee: Massachusetts Institute of Technology, Cambridge, Mass.

[21] Appl. No.: 20,989

[22] Filed: Feb. 22, 1993

[51] Int. Cl.⁶ .................................................. H04N 5/21
[52] U.S. Cl. ...................... 348/607; 348/618; 348/622
[58] Field of Search ................................ 358/141, 142, 358/143, 166, 163, 36, 37; 348/607, 618, 622; H04N 5/21, 7/00

[56] References Cited

U.S. PATENT DOCUMENTS

| | | | |
|---|---|---|---|
| 4,343,019 | 8/1982 | Lagoni | 358/31 |
| 5,040,063 | 8/1991 | Citta et al. | 358/141 |
| 5,086,340 | 2/1992 | Citta et al. | 358/141 |
| 5,087,975 | 2/1992 | Citta et al. | 358/183 |
| 5,105,442 | 4/1992 | Wei | 348/472 X |
| 5,121,203 | 6/1992 | Citta | 358/141 |
| 5,121,208 | 6/1992 | Citta et al. | 358/166 |
| 5,122,875 | 6/1992 | Raychaudhuri et al. | 358/133 |
| 5,132,797 | 7/1992 | Citta | 358/167 |
| 5,134,464 | 6/1992 | Basile et al. | 358/12 |
| 5,162,900 | 11/1992 | Citta | 358/167 |
| 5,181,112 | 1/1993 | Citta et al. | 358/141 |

*Primary Examiner*—Victor R. Kostak
*Assistant Examiner*—Nathan J. Flynn
*Attorney, Agent, or Firm*—Wolf, Greenfield & Sacks

[57] ABSTRACT

An HDTV receiver takes advantage of the detailed structure of the NTSC signal, namely the periodicity of the signal caused by the horizontal scan rate, in order to remove co-channel interference. A feedforward circuit is used to form an estimate of a current co-channel interference value from co-channel interference values occurring on previous scan lines. The estimate is subtracted from the signal to remove the co-channel interference at the expense of generating intersymbol interference. The circuit uses a form of decision-feedback equalization (DFE) in order to remove the intersymbol interference. The periodicity of the NTSC signal is exploited to allow the use of a high-rate trellis code in the DFE circuit.

11 Claims, 7 Drawing Sheets

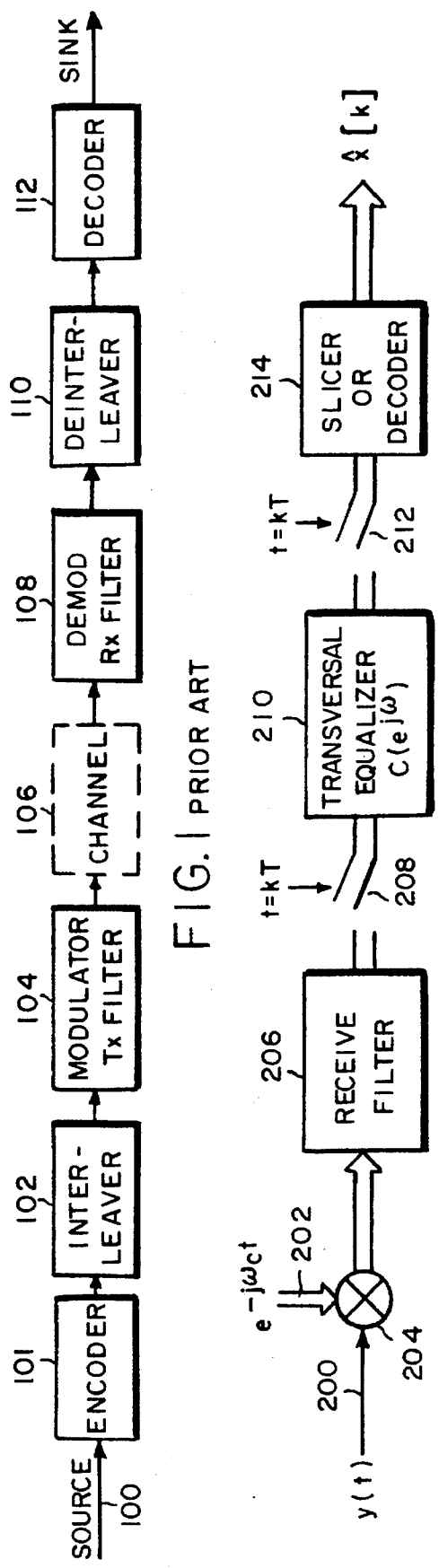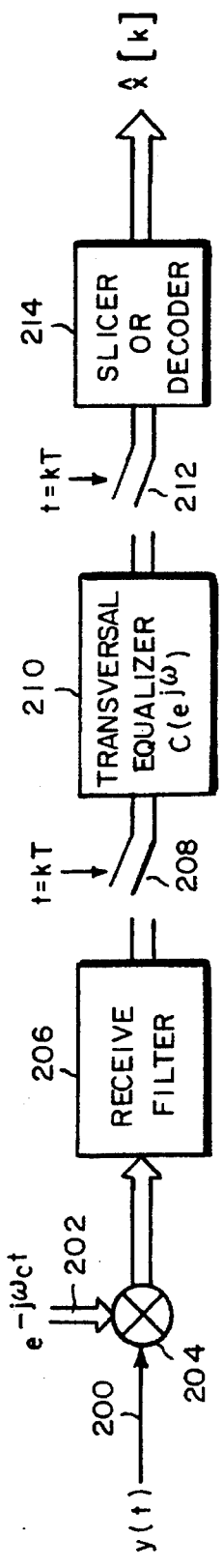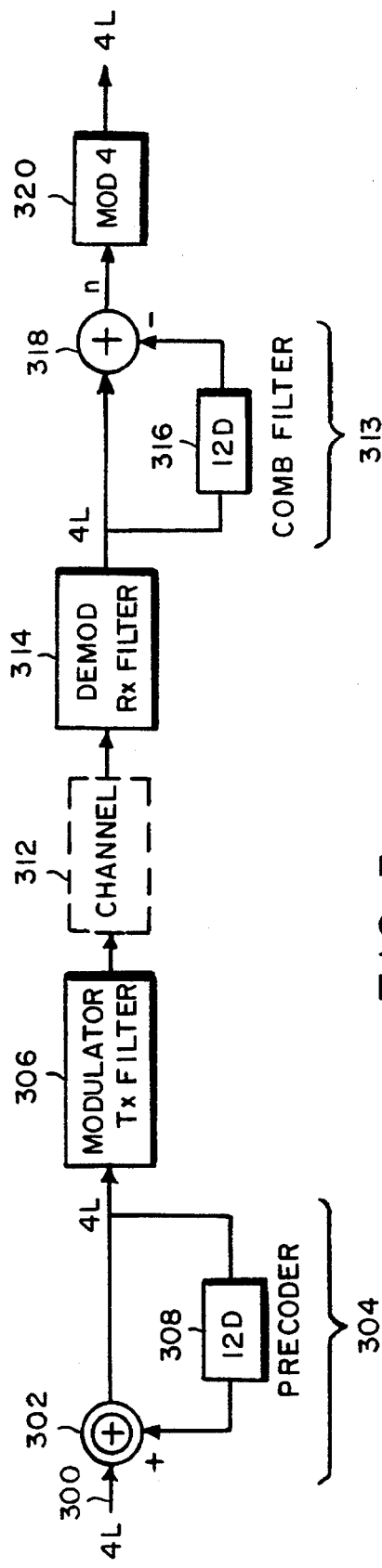

METHOD AND APPARATUS FOR DECODING BROADCAST DIGITAL HDTV IN THE PRESENCE OF QUASI-CYCLOSTATIONARY INTERFERENCE

FIELD OF THE INVENTION

This invention relates to digital high-definition television (HDTV) systems and, in particular, to coding methods and apparatus for transmitting picture information in broadcast HDTV systems.

BACKGROUND OF THE INVENTION

The present terrestrial broadcast television system used in the United States is the NTSC (National Television Systems Committee) system which specifies coverage areas and signal quality. In general, the NTSC system divides the portion of the radio spectrum allotted for over-the-air television broadcasting into numbered 6 MHz bands or channels. In order to decrease interference between adjacent 6 MHz channels, the entire broadcast region has been divided into a number of geographical areas. Within each geographical area, only some of the total available channels are used.

However, the United States is in the process of formulating a standard for terrestrial broadcasting of high definition television. The current standards for broadcast HDTV make the system incompatible with the NTSC system. Since the NTSC system has been in operation for many years and a large number of private receivers are in place, it has already been decided by the Federal Communications Commission (FCC) that NTSC broadcast service will be maintained to existing receivers for a number of years to allow these receivers to be phased out.

Consequently, the FCC has decided that the NTSC system will remain in operation and HDTV broadcasts will be simulcast with NTSC broadcasts. The FCC has also decided that the HDTV system must be able to operate with minimal impact on the NTSC system.

The FCC's decisions translate into several major constraints for the new HDTV system. First, there will be no new allocation of the radio spectrum for the new service; secondly, the present channel bandwidth of 6 MHz will be retained. Finally, in order to minimize any impact on the NTSC system, HDTV transmitters will be required to operate with power levels 10–15 dB below the power level of current NTSC transmitters.

The aforementioned constraints mean that the "taboo" channels in a given area will have to be used for the new HDTV service. This latter fact coupled with the low transmission power requirement means that some receiver locations (particularly those at the edges of NTSC geographical areas) will receive both NTSC signals and HDTV signals in the same frequency band, a problem called "co-channel" interference. Co-channel interference may be so severe in some locations that it degrades HDTV system performance.

Several different digital high definition television systems are currently being developed by competing concerns. These systems share broadly similar characteristics in terms of video source coding. More particularly all of the proposed systems have roughly twice the horizontal and vertical resolution of the current NTSC standard. At the proposed resolution, the digitized picture requires a data transmission rate of 1–1.5 gigabits per second, a rate which would be impossible to achieve with present technology. Consequently, source coding is used to reduce the required data transmission rate to 15–20 megabits per second (Mb/s) and still yield good quality images. All of the proposed systems use the same type of source coding which is based on motion-compensated frame-to-frame prediction and the application of a block discrete cosine transform to reduce the correlation between neighboring pixels.

However, the compressed picture information must still be encoded further in order to ensure proper protection against channel errors. In order to achieve efficient spectral coding the proposed systems use known techniques for encoding the data. These systems may include, for example, n-ary quadrature amplitude modulated systems (n-QAM) in which both the amplitude and the phase of the signal relative to the carrier phase are modulated to produce n separate signal points. Alternatively an n-level vestigial sideband system (n-VSB) can be used.

The proposed systems differ in the way that video information is encoded before transmission over-the-air. One of the reasons for these differences is that each proposed system has given different degrees of importance to the various constraints discussed previously including: minimal impact on current NTSC coverage areas, robustness to NTSC interference, particularly co-channel interference, low transmitter power relative to NTSC, fixed bandwidth of 6 MHz and transmission in the so-called taboo channels.

Among these constraints, co-channel interference from neighboring NTSC stations is of particular importance. It is generally agreed that the HDTV service will be co-channel interference limited, rather than noise limited. Part of the reason is that noise is generated mostly in the receiver front-end and can be reduced by, among other things, appropriate design of the tuner, but the co-channel interference level depends on the location and power of the interfering station. However, when the existing NTSC receivers are eventually phased out, it is desirable that the HDTV system design be reconfigurable so that optimal transmission can be achieved in the absence of NTSC interference.

There are several conventional ways to deal with co-channel interference. One known method is to treat the interference as noise. This is what is effectively done in one known system by using a symbol interleaver between the encoder and the modulator transmit filter at the transmitter end and a deinterleaver at the receiver end between the demodulator receive filter and the decoder. Such a system is shown in FIG. 1. The source bit stream 100 is provided to an encoder 101, whose output, in turn, is provided to an interleaver 102 of conventional construction. The output of the interleaver 102 is, in turn, provided to the modulator and transmit filter 104. The output of the transmit filter 104 is sent over the broadcast channel 106 which is indicated by the dotted box 106. The signal plus the noise and interference arrives at the receive filter 108 and then is provided to the demodulator. The demdulator output is provided to the deinterleaver 110. The deinterleaver 110 restores the symbol stream but scrambles the noise and the interference. The data is then decoded by a decoder 112. This method has several advantages. One is that the interference becomes equivalent to added noise and, in fact, has a lesser impact on the probability of error than additive white Gaussian noise with the same noise power. A second advantage is that interleavers are usually part of conventional transmission systems and therefore the design of the rest of the transmission system, in particular the equalizer, is well understood.

However, there are also drawbacks to this method. For example, additional delay is introduced and, while the system will work well for situations where the carder to interference level is high compared to the carder to noise level, it will perform poorly in the presence of strong interference.

Another known system is called the "DigiCipher" system proposed by General Instruments Corporation (GI). In this system, a linear equalizer mitigates the effect of the NTSC interference. FIG. 2 shows a simplified receiver for use with this system, in which the received signal is y(t),200. The signal y(t) is translated to baseband frequency as represented schematically by multiplier 204. The resulting noisy baseband signal as received over the channel is provided to the receiver. The receiver comprises a matched filter 206, a symbol-rate sampler schematically represented by switches 208 and 212 driven at the rate t=1/T, a symbol-spaced equalizer 210 and a slicer 214. In practice, the receiver would not be implemented in this fashion, but the example illustrates the principles involved. The filter function C ($e^{jw}$) is chosen so that the mean square error MSE) at the output of the filter is minimized. The error between the slicer input and the transmitted symbol is the sum of the residual intersymbol interference (ISI) and the noise. Therefore, the power spectrum of the error is given by:

$$\sigma_{2x}|1-S_h(e^{jw})|^2+N(e^{jw})S_h(e^{jw})|^2 \quad (1)$$

where $\sigma^2_x$ is the signal power, $S_h$ ($e^{jw}$) is the folded spectrum of the received pulse and N ($e^{jw}$) is the power spectral density of the noise. The MSE is the integral of equation (1). It is minimized by setting C($e^{jw}$) as follows:

$$C(e^{jw}) = \frac{\sigma_x^2}{\sigma_x^2 S_h(e^{jw}) + N(e^{jw})} \quad (2)$$

If the interference has strong spectral components at given frequencies, then the equalizer will attenuate those frequencies at the expense of increased inter-symbol interference and enhanced noise. In general, minimized MSE equalization should work well except in case of strong NTSC interference.

Another method that has been proposed in the context of a known prior art system known as the Zenith/AT&T Digital Spectrum Compatible system. This system uses a form of precoding at the transmitter and comb filtering at the receiver to create spectral nulls which are positioned near the main NSTC spectral components. The basic system is schematically shown in FIG. 3.

The basic modulation configuration for this proposal is as shown in FIG. 1. However, a precoder 304 (FIG. 3 ) is inserted between the encoder 101 (in this case a Reed-Solomon encoder would be used) and a modulator 306 and operates in the digital domain. The input 300 to the precoder 304 is a four-level signal (4L). It is precoded with a modulo-4 adder 302 (a nonlinear operation) and a delay element 308. By choosing the delay element appropriately, spectral nulls can be positioned close to the locations of the NTSC video, color and audio carrier frequencies, thereby eliminating the steady-state portion of the interference. For a 4VSB modulated signal with the carrier on the band edge, the required delay corresponds to 12 symbols (indicated as 12 symbol delays, 12D). The output of the precoder is applied to the channel 312 via the modulator 306.

The operation perforated by the modulo-4 adder 302 can be reversed by a linear operation performed at the receiver. Specifically, the signal received from the channel 312 is applied, via demodulator 314, as a four level signal (4L) to a comb filter 313 comprised of a 12 symbol delay element 316 and a digital adder 318. The output of the comb filter is a 7 level signal, 7L, which is applied to a modulo-4 decoder 320 to produce a 4 level output signal. The portion of the interference that does not get rejected is then passed through a deinterleaver 110 as shown in FIG. 1.

The noise performance of this latter system is degraded by 3 dB when the co-channel interference is the major source of degradation. However, if co-channel interference is not a problem, as would be the case in most areas and in all areas when NTSC receivers are phased out, the receiver can be redesigned so that the exact inverse of the precoder can be used at the receiver with almost no noise performance loss and simply a doubling of the symbol error rate.

This redesigned system is shown in FIG. 4. Most of the system is equivalent to the system shown in FIG. 3 and equivalent elements have been given similar numerals (for example, modulo-4 adder element 302 in FIG. 3 corresponds to modulo-4 adder element 402 in FIG. 4). The receiver has been modified by adding a slicer 422 and a post-coder 424 after the demodulator 414. Post-coder 424 is comprised of a 12 symbol delay element 426 and a modulo-4 adder 428.

One drawback of this system is that it appears to require hard-decision decoding (the slicer 422 is placed before the postcoder 424) in the case where a modulo-4 postcoder is used. This method is therefore not compatible with maximum likelihood soft decision decoding and cannot be expected to produce optimum results. Further, the design does not use a high-rate signal sequence coding scheme, such as trellis coding; instead error control is implemented with a single stage Reed-Solomon code. Therefore, even after NSTC co-channel interference is abated, the redesigned system cannot be made optimal.

The proposed design also takes advantage of the strong attenuation of existing NTSC receiver filters near the low end of the RF band by generating a pilot tone at these frequencies to aid carrier recovery. As discussed below, this pilot tone may interfere with the NTSC system due to non-linearities in the transmitter and receiver components.

Another system was proposed by the Advanced Television Research Consortium for the ADTV system. In this latter system, the data is organized in two streams and transmitted in a multichannel mode. Each stream is modulated on its carrier with a 32-QAM scheme (optionally a 16-QAM scheme). The streams are separated and arranged so that part of the signal is transmitted in a band below the NTSC career frequency and pan of the signal is transmitted in a band located above the NTSC carrier frequency. A null occurs at the NTSC carrier frequency; consequently, no signal power is transmitted near this frequency. The power spectral density of the lower frequency band or the "high priority career" is higher by 5 dB compared to the higher frequency band or "standard priority career". This power difference ensures that the carrier-to-noise threshold of the high-priority channel is 5 dB lower than the career-to-noise threshold of the standard priority channel. The high priority data represents one fifth of the total power. This data transmission scheme can be viewed as a particular case of data transmission using a modulation scheme with an unequal constellation. As transmission schemes of this type are known, the scheme will not be discussed further herein.

As with the previous proposed design, this latter design relies on the fact that the high priority channel occupies a band which is normally strongly attenuated by the Nyquist filters of NTSC receivers, and the idea is that this high power digital signal will cause very little interference to NTSC receivers, while at the same time avoiding the NTSC video carrier frequency that is the frequency component most detrimental to the HDTV signal. However, it is not known whether all NSTC receivers will be immune to an increased interference level near DC. Another aspect that could cause problems is the presence of nonlinearities either at the transmitter or the receiver. One example of nonlinear element is the Traveling Wave Tube (TWT) amplifier that is often used in the RF stage of the transmitter. The transfer characteristic of a traveling wave tube near the saturation region is nonlinear and operation in this region would lead to the creation of both in-band and out-of-band intermodulation products between the two carriers.

Another problem may arise from the fact that timing recovery is derived from the high priority channel. The narrowband characteristic of the high priority channel may result in a slow acquisition time compared to a signal with basic sampling rate 5 times higher.

Further, this latter system requires the signal to be formatted at the transmitter. Consequently, when NTSC interference is no longer a problem, the signal will be sub-optimal because it wastes bandwidth at the NTSC carrier null, but at that time the number of existing receivers will be so numerous that it will not be possible to change the signal formatting.

For reference, the reported performance for three proposed systems discussed above is given in Table 1.

TABLE 1

| System | Modulation | C/I |
|---|---|---|
| GI | 32-QAM | 7 dB |
|  | 16-QAM | 2 dB |
| Zenith | 4-VSB | 0 dB |
|  | 2-VSB | −6 dB |
| ATRC | SP 32-QAM | −2 dB |
|  | HP 32-QAM | −6 dB |

SUMMARY OF THE INVENTION

In accordance with one embodiment of the invention, a decoding method and apparatus is used to remove an interfering signal from a digitally-modulated signal. The novel method and apparatus takes advantage of certain characteristics of the interfering signal to remove the interference while still allowing the use of efficient coding schemes FOR the digitally-modulated signal. More particularly, the inventive method is useful for removing interfering signals which are random or non-random and have the property of being almost "cyclostationary". As used herein "cyclostationary" means that the statistical moments of the interference process vary in time and are periodic. These interfering signals will be termed "quasi-cyclostationary" in the remainder of this description. An example of a quasi-cyclostationary signal is co-channel NTSC interference.

In accordance with one embodiment of the invention, co-channel NTSC interference is removed from a trellis-coded HDTV signal. In this latter embodiment, the quasi-periodicity of the NTSC signal caused by the horizontal scan rate is utilized in order to remove the co-channel interference. More specifically, a feedforward circuit is used to form an estimate of a current co-channel interference value from co-channel interference values occurring on previous scan lines. The estimate is subtracted from the signal to remove the co-channel interference at the expense of generating intersymbol interference. The circuit uses a form of decision-feedback equalization (DFE) in order to remove the intersymbol interference.

The inventive method and apparatus have the advantage that they are compatible with most known channel coding techniques and do not assume that the interfering signal has fixed statistics. Further, the inventive method and apparatus is confined to the decoding process and thus can be disabled in situations where the interference is weak or absent while still maintaining optimal coding of the digitized signal. In the particular case of NTSC interference, the inventive method and apparatus will not adversely affect the reception of NTSC signals by conventional receivers.

BRIEF DESCRIPTION OF THE DRAWING

FIG. 1 is a block schematic diagram of a prior art channel coding system using interleaving.

FIG. 2 is a block schematic diagram of the prior art channel coding system called the "DigiCipher" proposed by General Instruments.

FIG. 3 is a block schematic diagram of a prior art channel coding system using precoding and proposed by Zenith/AT&T.

DETAILED DESCRIPTION OF THE PREFERRED EMBODIMENTS

Figure 4:
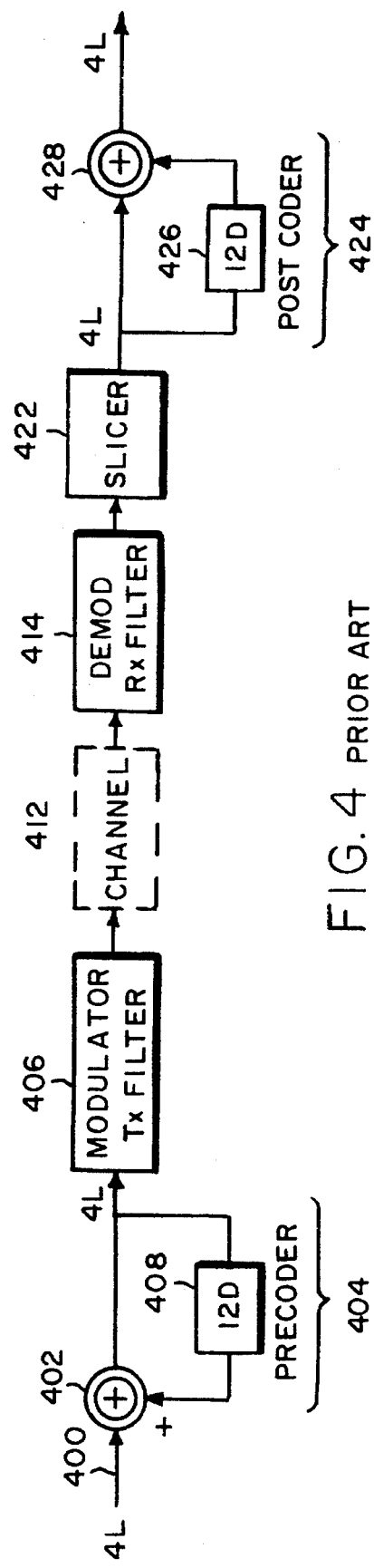
FIG. 4 is a block schematic diagram of the prior art Zenith/AT&T channel coding system as shown in FIG. 3 reconfigured to operate at maximum efficiency in the absence of co-channel interference.
Figure 5:
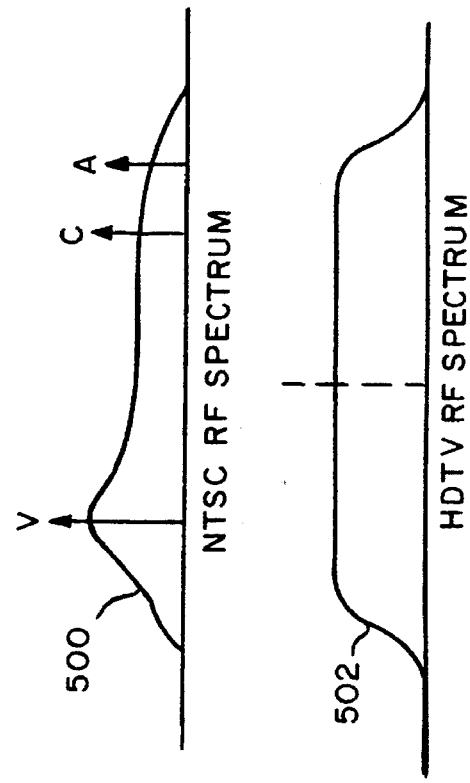
FIG. 5 is a diagrammatic illustration of the RF spectrums of the existing NSTC and proposed HDTV systems for a selected 6 MHz channel.

As previously mentioned, the most dominant restriction to HDTV system performance is co-channel interference between HDTV signals and existing NTSC signals. Co-channel interference occurs when two spatially separated transmitters use the same frequency band and the receiver does not discriminate between the two received signals by spatial or other means. FIG. 5 shows a generalized NTSC signal 500 and an HDTV signal 502 occupying the same channel band. The resulting co-channel interference can be modeled as follows.

Referring back to FIG. 1, in order to simplify the calculations, it is assumed that channel 106 is ideal and that the only degradations are Gaussian noise and NTSC interference. The received signal r(z) after translation to baseband, matched filtering and sampling can be written as a sum of three terms:

$$r(z)=x(z)+i(z)+n(z) \tag{3}$$

where x(z) is the transmitted signal in Z-transform notation, i(z) is the NTSC interference and n(z) is white Gaussian noise.

Figure 6:
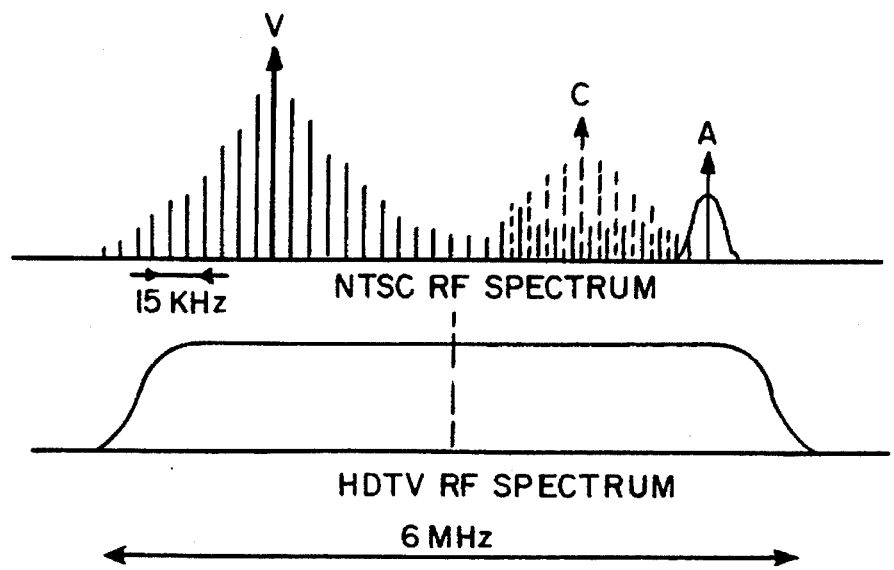
FIG. 6 is an expanded illustration of the RF spectrums of the existing NSTC and proposed HDTV systems for a selected 6MHz channel showing the fine structure of the NTSC signal which occurs at horizontal line scan frequencies.

Examining the characteristics of the interference in more detail, the power spectral density of the interference signal is shown schematically in FIG. 6. The NTSC signal consists essentially of three components: a VSB luminance signal with carrier (shown as V on the figure), a QAM chrominance signal (shown as centered around C in the figure) and an FM audio signal (shown as A). The NTSC spectrum exhibits strong periodicities at the line-scan rate (15 KHz and its harmonics) which periodicities are due to the high correlation between successive scan lines of an NTSC television picture. Moreover, for most pictures, there is very little spectral energy between the line-rate harmonics both for the luminance and chrominance signals. This fact is used in conventional broadcasting to interleave the chrominance and luminance frequencies within the same frequency band. The following discussion will be mostly concerned with the luminance signal and the associated video carrier, since they represent the major contribution of the interference.

In the continuous time domain, the luminance signal component at the input of the IF filter in the receiver can be written as:

$$i(t)=A[1+x(t)]cos(2\pi f_{cv}t)+A\gamma(t)sin(2\pi f_{cv}t) \tag{4}$$

where x(t) is the luminance waveform, $f_{cv}$ is the NTSC carrier frequency and $\gamma(t)$ is a small term ($|\gamma(t)|<<1$) arising from the VSB modulation ($\gamma(t)=0$ for AM, $\gamma(t)=\hat{x}(t)$ for single sideband modulation with $\hat{x}(t)$ the Hilbert transform of x(t)).

Figure 7:
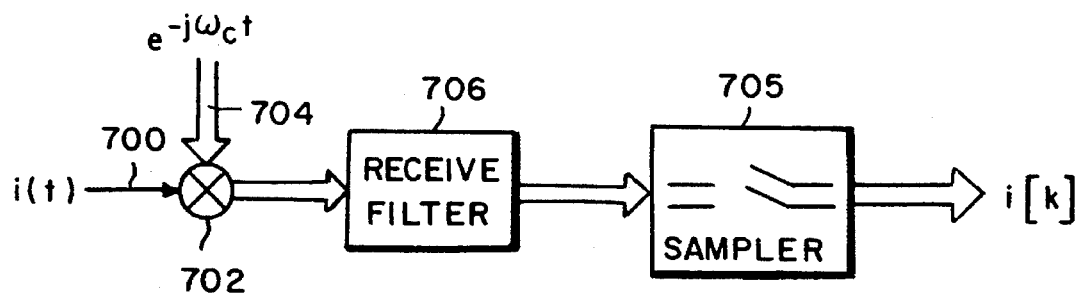
FIG. 7 is a simplified block diagram of a prior art receiver front end.

A simplified front end of an HDTV receiver is shown in FIG. 7. The incoming interference stream 700 corresponding to i(t) is translated to baseband by multiplier 702 which receives the local oscillator signal 704 ($e^{-j\omega_c t}$). The translated signal is filtered by the receive filter 706 and sampled by sampler 708. After translation to baseband and sampling, the interference term i[n] will correspond to the sampled version of a carrier term at the frequency $f_{cv}-f_c$ where $f_c$ is the RF carrier frequency of the HDTV signal and amplitude modulated terms containing the luminance information:

$$i[k]\cong A[1+x(kT)]e^{j2\pi(f_{cv}-f_c)kT}-jA\gamma(kT)e^{j2\pi(f_{cv}-f_c)kT} \tag{5}$$

where T is the sampling period. In this expression, the only unknowns are x(kT) and $\gamma(kT)$, which are derived from the sample values along an NTSC scan line, and A, the scaling factor. The HDTV receive filter should not appreciably change the baseband NTSC signal because the frequency response is essentially flat over the bandwidth of the NTSC signal. It is assumed that the sampling rate $f_s=1/T$ is chosen to be a multiple of the NTSC line scan rate $f_L$ and that the frequency offset of the HDTV carrier with respect to the NTSC carrier is chosen so that ($f_{cv}-f_c$) is also a multiple $f_L$.

Due to the high correlation of the signal between scan lines and the deterministic nature of the carrier term, it has been found, in accordance with the invention, that it is possible to predict fairly accurately the current value of the interference (x (kT), $\gamma$(kT)) based on previous values corresponding to samples immediately above the current position on the NTSC scan line. According to one embodiment of the invention, this prediction enables the use of a long delay which, in turn, makes it possible to use decision feedback equalization in conjunction with trellis coding for greatly improved performance. For instance, if the sample rate is $f_s=5.2$MHz and the NTSC scan line rate is $f_L=15.75$kHz, the number of samples separating two highly correlated NTSC sample values, or the period of the complex waveform, K=330 samples, a value that allows the use of a relatively long delay line.

Figure 8:
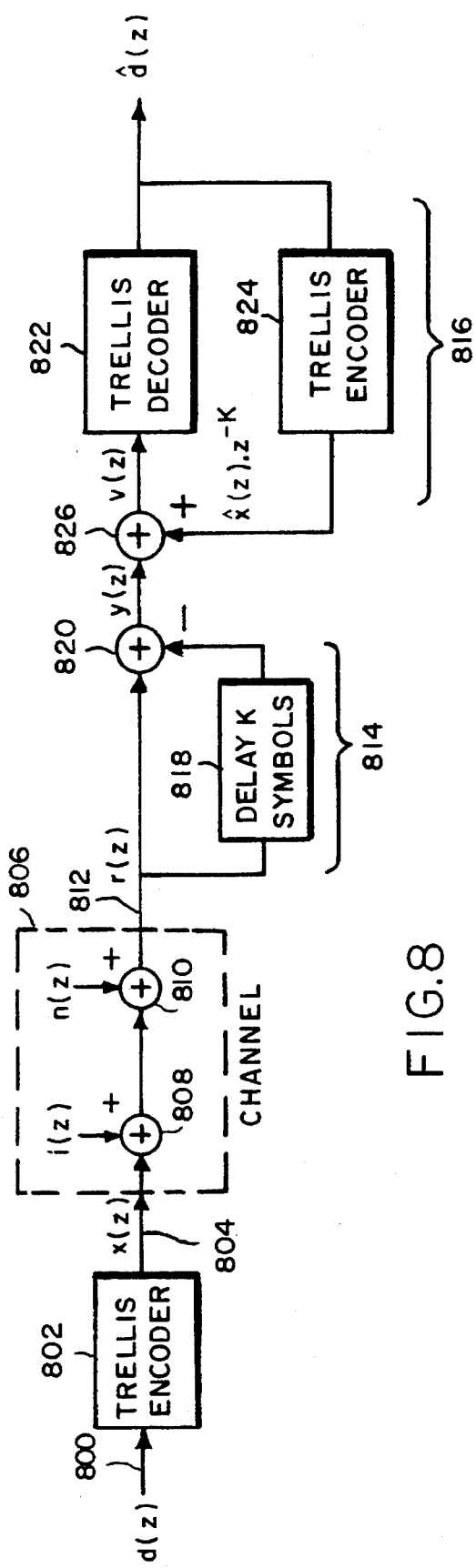
FIG. 8 is a simplified block diagram of a portion of an HDTV receiver constructed in accordance with the principles of the invention which removes co-channel interference for a simple NSTC signal.

A block diagram of a discrete time equivalent system constructed in accordance with the principles of the invention is shown in FIG. 8. The data stream d(z), 800, is applied to a trellis encoder 802. The trellis encoder 802 is a known circuit that encodes the data stream based on a sequence of symbol values. In accordance with known trellis encoder design, redundancy is added by using more signal points in the signal constellation than are needed for the same data rate using conventional QAM. The selection of which constellation point is chosen during encoding is determined by convolutionally encoding selected bits in the data stream. This convolutional encoding produces a dependency between successive signal symbols and only certain patterns or sequences of QAM signals are allowed. The allowed sequence of transitions can be modeled as a trellis structure and hence the name, "trellis coding". The design and construction of encoder 802 is known and described in detail, for example, in articles entitled "Channel Coding with Multi-level/phase signals", G. Ungerboeck, *IEEE Transactions on Information Theory*, v. 28, pp. 55–67 (1982)and "Trellis-coded Modulation with Redundant Signal Sets, Part I and II", G. Ungerboeck, *IEEE Communication Magazine*, v. 25, pp. 5–21(1987) which articles are hereby incorporated by reference. The encoded output x(z) 804 is transmitted over the channel which is represented by dotted box 806. In the channel, the signal is subject to co-channel interference i(z) and Gaussian noise n(z) which are modeled as additive and are added by adders 808 and 810. The resulting signal r(z) on line 812 is provided to the receiver circuitry constructed in accordance with the principles of the invention.

The receiver circuitry comprises a feedforward circuit, 814, and a feedback circuit, 816. The feedforward circuit 814 cancels the predictable part of the co-channel interference but at the expense of introducing known intersymbol interference. The circuit consists of a K symbol delay line 818 and an adder 820. Basically the symbol stream is delayed by K symbols and subtracted from symbol stream. The feedforward circuit exploits the structure of the power spectral density of the NTSC spectrum shown in FIG. 6. More particularly, if the interfering signal consisted only of the carrier tone, the discrete time samples i[k] could be canceled exactly by i[k−K] where K is a multiple of the number of samples in one period of the (complex) interference waveform. The signal after the feedforward circuit would then be:

$$y[k]=r[k]-r[k-K]=x[k]+n[k]-x[k-K]-n[k-K] \tag{6}$$

As shown in equation (6), in the process of removing the co-channel interference, both a noise term n[k−K] and, most importantly, an intersymbol interference term (x[k−K]) have been added. The output y(z) of the feedforward circuit is provided to the feedback circuit 816. The feedback section 816 includes a trellis decoder 822, a trellis encoder 824 and an adder 826. Feedback section 816 cancels the intersymbol interference (ISI) introduced by the feedforward section in removing the co-channel interference by providing a delayed estimate of x[k].

Assuming that K is chosen to be at least as large as the minimum delay through the decoder 822 and encoder 824 loop, then the input to the trellis decoder 822, v[k], equals y[k]−x̂[k−K] after possibly delaying x̂[k−K] further so that the overall delay is K. In this case, the intersymbol interference has been eliminated at the expense of a 3 dB increase in random noise:

$$v[k]=x[k]+n[k]-x[k-K]-n[k-K]-\hat{x}[k-K]=x[k]+n[k]-n[k-K] \quad (7)$$

One common problem with using decision feedback with coded systems is that typically short delay or delay-free decisions are required to cancel the ISI generated by the most recent symbols. Trellis decoders typically require a delay of 4–5 times the constraint length of the trellis code in order to obtain reliable decisions. Therefore, if trellis decoders are used in decision feedback loops, the required short delay or delay-free decisions are often highly unreliable and cannot be used for feedback without seriously degrading the performance of the decoder.

Typically, decision feedback is used in equalizer structures to remove the ISI introduced by the channel where no coding is required. For systems which require coding (such as the present system), a simple juxtaposition of coding and equalization will not perform well in the presence of substantial ISI and co-channel interference.

Recently, some prior art schemes have been investigated in which the coding and equalization are combined in an effective manner, but some of the schemes rely on a priori knowledge of the channel characteristics in order to precode the signal at the transmitter.

However, in accordance with the principles of the invention, it is possible to choose a long delay to cancel out the carrier tone, or a delay corresponding to a whole NTSC scan line in the case where we want to predict the current value of the interference term from past values on the previous scan line. This delay is much larger than the delay of 4–5 times the constraint length of the trellis code required to obtain reliable decisions out of a conventional trellis decoder.

Another consideration is that the co-channel interference is, in fact, dependent on the location of the receiver and will vary widely across the coverage area. A receiver constructed in accordance with the invention makes it easy to disable the interference rejection circuit altogether if the interference level is not a problem. This can be done by simply removing the feedforward circuit 814 and feedback trellis encoder 824 and adder 826. In this case, since the signal is not precoded at the transmitter, the full coding gain of the trellis code without noise enhancement can be achieved.

In the simple receiver circuit shown in FIG. 8, the noise performance was degraded by 3 dB noise. If, however, the current value of the intersymbol interference is expressed as a prediction based on some weighted average of past samples on the previous scan line, a smaller increase of the random noise can be achieved. For example, assume that i[k] can be predicted as î[k] using the formula:

$$\hat{i}[k] = \sum_{l=1}^{N} \alpha_l i[k-k_l] \quad (8)$$

with the property that:

$$\sum_{l=1}^{N} \alpha_l = 1 \quad (9)$$

Then the output y[k] of the feedforward circuit becomes:

$$y[k] = r[k] - \sum_{l=1}^{N} \alpha_l r[k-k_l] \quad (10)$$

and $$y[k] \cong x[k] + n[k] - \sum_{l=1}^{N} \alpha_l(x[k-k_l] + n[k-k_l]) \quad (11)$$

and the input to the trellis encoder becomes:

$$v[k] = y[k] + \sum_{l=1}^{N} \alpha_l \hat{x}[k-k_l] \quad (12)$$

and $$v[k] \cong x[k] + n[k] - \sum_{l=1}^{N} \alpha_l n[k-k_l] \quad (13)$$

Figure 9:
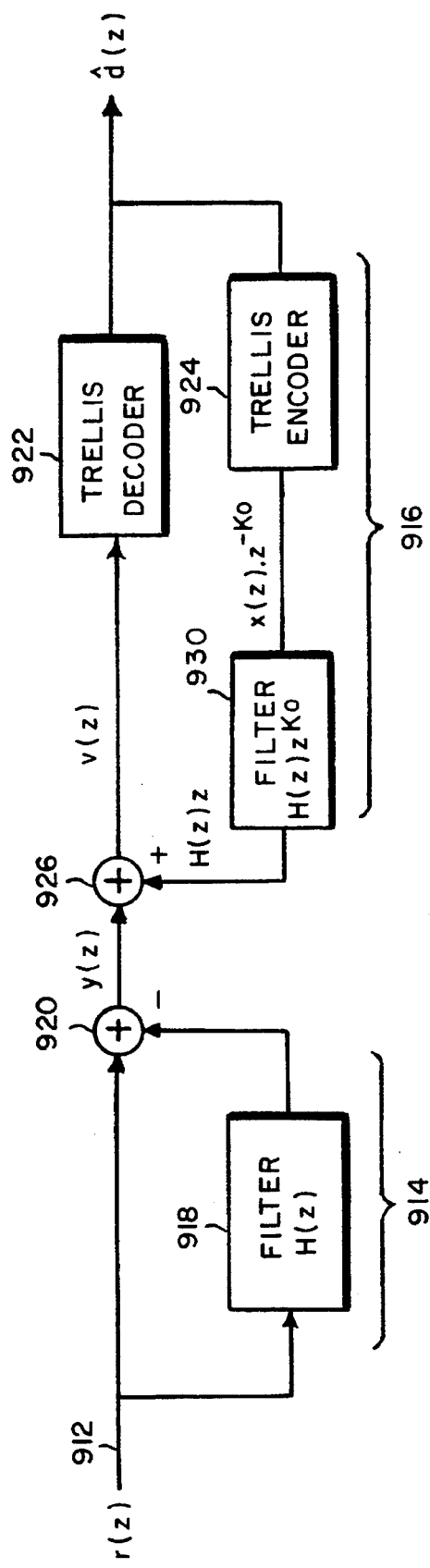
FIG. 9 is a simplified block diagram of a portion of an HDTV receiver constructed in accordance with the principles of the invention with improved noise performance over the circuit of FIG. 8.

This prediction can be implemented by means of a receiver as shown in FIG. 9. FIG. 9 shows the feedforward and feedback portions of the receiver circuit shown in FIG. 8 which have been modified to accommodate the changes noted above. Circuit elements in FIG. 9 which correspond to elements in FIG. 8 have been given corresponding numerals. For example, adder 920 in FIG. 9 corresponds to adder 820 in FIG. 8. Comparing FIG. 9 to the simplified receiver in FIG. 8, it is apparent that the simple delay line 818 has been replaced with a filter function 918 (H(z)) in the feedforward circuit and an additional filter function 930 has been added in the feedback loop 916 (H(z)z^{Ko}).

The noise power is now equal to $$\left(1 + \sum_{l=1}^{N} \alpha_l^2\right)\sigma^2$$

as compared to $2\sigma^2$ previously. Suppose $\alpha_l = 1/N$, then the increase in noise variance is $\sigma^2$ in the simplified circuit shown in FIG. 8 while it is $\sigma^2/N$ in the improved circuit shown in FIG. 9. Therefore, as the number of samples, N, used to predict the current ISI value. This is illustrated in the table below:

TABLE 2

| N | Noise Enhancement |
|---|---|
| 1 | 3.0 dB |
| 2 | 1.7 dB |
| 3 | 1.2 dB |
| 4 | 0.9 dB |
| 10 | 0.4 dB |

The operation of the inventive circuit can also be explained by a frequency-domain analysis as well as the time-domain analysis discussed above. More particularly, let $f_L$ be the NTSC line scan rate. The principal components of the NTSC signal are:

1) the visual carrier ($f_{cv}$) located at 1.25 MHz from the lower band edge, 2) the chrominance subcarrier ($f_c$) located at $f_{c_v}+$ 3.58MHz or $f_{c_v}+227.5f_L$, and 3) the aural carrier ($f_{c_a}$) located $f_{c_v}+4.5$MHz or $f_{c_v}+286f_L$.

Figure 10A:
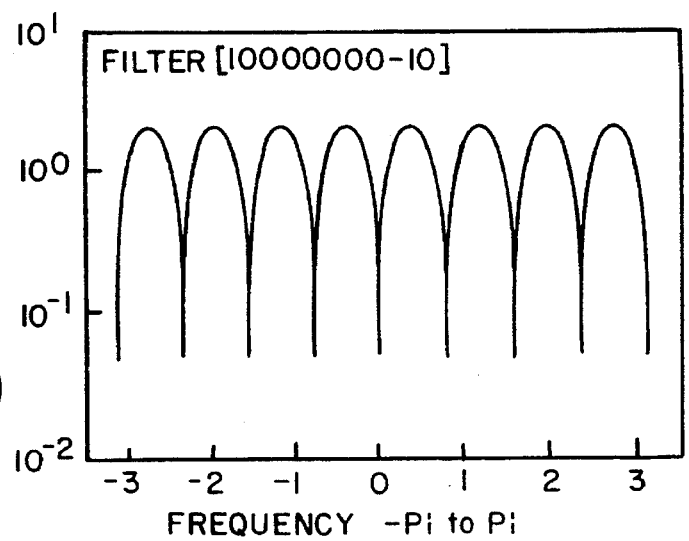
FIGS. 10(a)–10(c) are frequency plots of various comb filter function formed by varying the filter parameters.

If the sampling frequency $f_s$ is chosen to be a multiple of $f_L$ (for example, $f_s=Kf_L$, with K=330) and if $H(z)=z^{-K}$, the feedforward circuit section will correspond to applying a comb filter with nulls spaced $f_L$ apart. By choosing $f_c-f_{c_v}$ to be a multiple of $f_L$, we can place nulls at $f_{c_v}$ and $f_a$. The frequency response of the feedforward section is illustrated in FIG. 10(a) for K=8 (a comb filter with $H_o(z)=1=z^{-8}$).

Figure 10B:
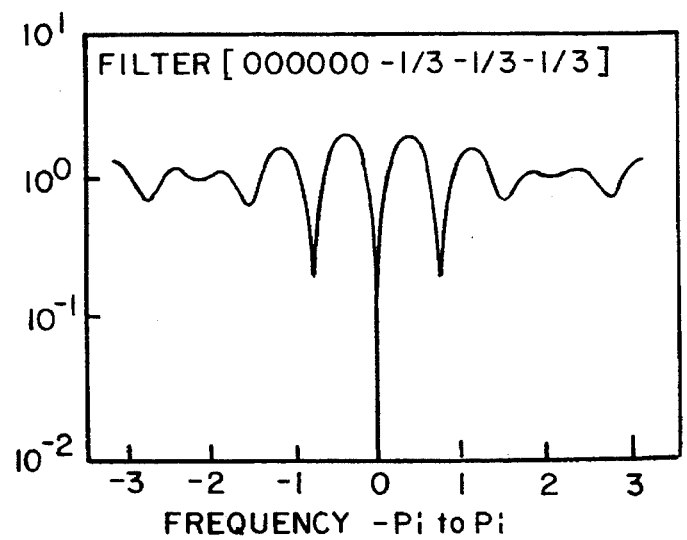
Figure 10C:
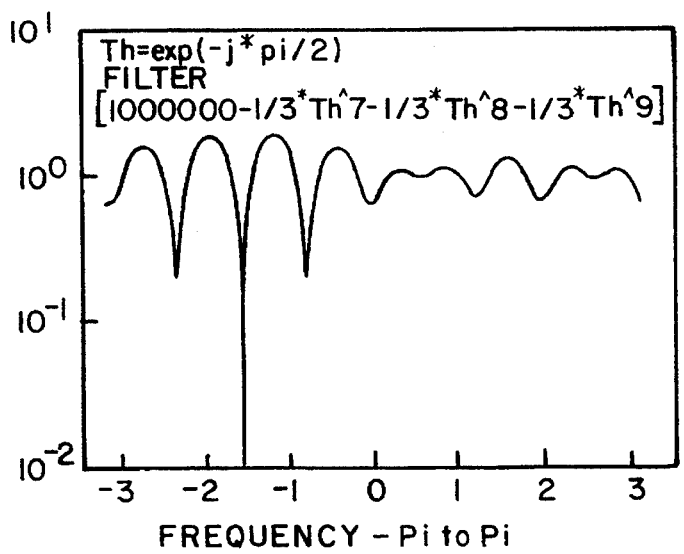

Suppose we choose $H(z)=(z)_{-K+1}+z^{-K}+z^{-K-1})/3$. Then we have a null at ω=0 corresponding to $f_c$ and partial nulls at $f_c \pm_L$ as shown in FIG. 10(b) which corresponds to a comb filter with $H_1(z)=1-(z^{-7}-z^{-8}-z^{-9})/3$. However, what is really desired is a null at $f_{c_v}$. This null is achieved by choosing the filter function as $H(ze^{-j\omega_o})$ where $\omega_o=2\pi(f_{c_v}-f_c)/f_s$. 10(c) shows the frequency response of the feedforward section when $\omega_o=-\pi/2$, which corresponds to $f_{c_v}=f_c-f_s/4$ and results in a comb filter design with $H_2(z)=H_1(ze^{j\pi/2})$. From these figures, it is easy to see how to obtain nulls at selected frequencies including at $f_{c_v}$ by an appropriate choice of $\omega_o$. It should be noted that with this approach, noise is enhanced by a factor:

$$1+\frac{1}{2\pi}\int_{-\pi}^{\pi}|H(e^{jw})|^2 d\omega \quad (14)$$

Figure 11:
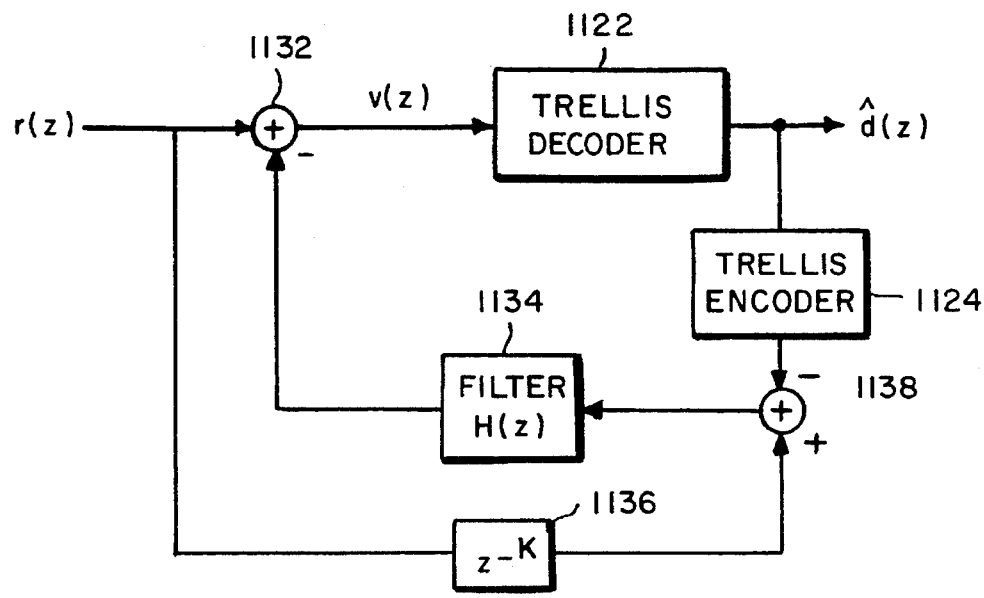
FIG. 11 is a reconfigured simplified block circuit diagram of the circuit shown in FIG. 9.

The system shown in FIG. 9 can be transformed into an equivalent structure as shown in FIG. 11 by well-known techniques. In the FIG. 11 circuit, the trellis decoder 1122 and the trellis encoder 1124 are still present, but the adders 920 and 926 in FIG. 9 have been combined into adder 1132 and filters 918 and 930 have been combined into filter 1134. Element 1136 represents the delay through the decoder (K), and the output of the filter circuit 1134, H(z), is a prediction of the NTSC interference.

The structure shown in FIG. 11 is related to known circuits called "noise-predictive decision feedback" circuits. Noise-predictive decision feedback has been proposed in the context of uncoded systems as a way of predicting the residual noise sequence at tile output of a linear equalizer. In this case, the equalizer generates an output sequence r(z) free of ISI but corrupted by noise and NTSC interference.

Figure 12:
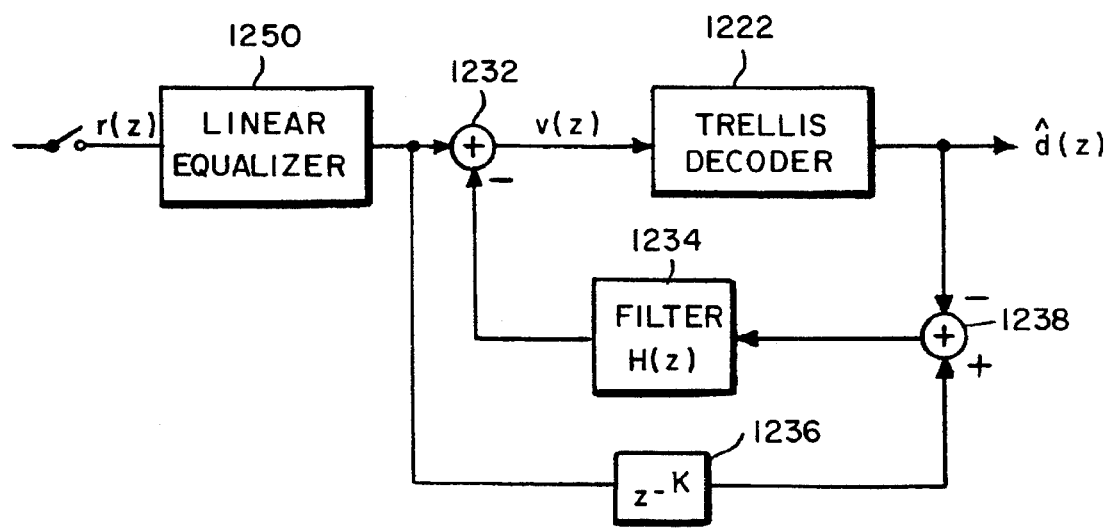
FIG. 12 is a simplified block diagram of a circuit constructed in accordance with the principles of the invention in which a linear equalizer has been added to remove multipath and other distortions.

With the circuits described above, equalization is required to remove multipath and other linear distortions from the HDTV signal. The principles concerning the use of adaptive equalization to combat ISI are well-known. Often the adaptation criterion is to minimize the joint effect of Gaussian noise and ISI; a technique used by so-called linear equalization-mean square error circuits (LE-MSE). A LE-MSE equalizer is a compromise—it allows some ISI to pass through in order to reduce the noise enhancement. In the case of the circuits described above, the interference rejection circuit can be combined with equalization. One possibility is to include a linear equalizer before the feedback loop formed by the trellis decoder, trellis encoder and loop filter in FIG. 11. Such a configuration is shown in FIG. 12 where elements corresponding to FIG. 11 elements have been given corresponding numeric designations and the linear equalizer is shown as element 1250.

Figure 13:
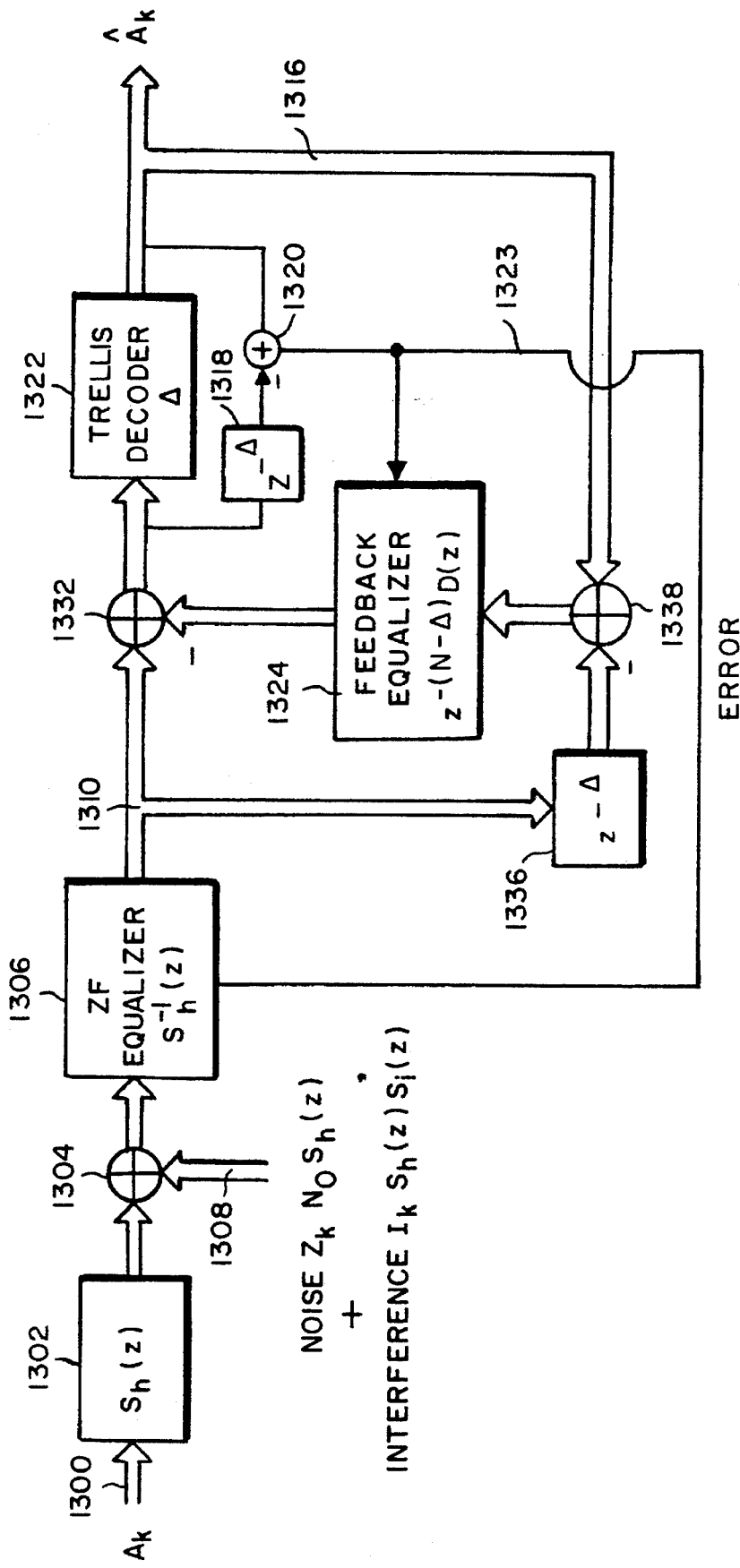
FIG. 13 is a simplified block diagram of a circuit constructed in accordance with the principles of the invention in which an adaptation circuit has been added to optimally remove interference.

FIG. 13 illustrates an adaptive embodiment of the inventive circuit. In FIG. 13, an incoming symbol stream is comprised of a sequence $\{A_k\}$ of independent M-ary data symbols and schematically represented by arrow 1300. In order to simplify the analysis it is assumed that the received signal spectrum does not possess deep nulls due to multipath propagation and, thus, a zero-forcing criterion can be used throughout the analysis. Element 1302 ($S_h(z)$) schematically represents the combined response of the transmitter pulse shaping, the channel response and matched filtering performed at the receiver front-end. The noise and interference are represented by $Z_k$ and $I_k$, respectively, and are schematically illustrated as being added to the symbol stream by adder 1304.

The noisy symbol stream is applied to a feedforward filter comprising a zero-forcing (ZF) linear equalizer 1306 which has an impulse response of $S_h^-(Z)$. The ZF linear equalizer is designed to be independent of the number of feedback coefficients and, therefore, the number of feedback coefficients can be varied independently. Illustratively, the ZF equalizer coefficients can be calculated by a known method such as the method of steepest descent.

The output of the ZF equalizer is applied, via path 1310, to an adder 1332 and a delay element 1336. The delay, Δ, is the minimum delay through the trellis decoder necessary to obtain reliable decisions typically 4 to 5 times the constraint length of the code). The delayed equalizer output and the symbol estimates generated by the trellis decoder 1322 on path 1316 ($\hat{A}_k$) are subtracted by element 1338 and applied to the feedback equalizer 1324 which has an impulse response of $z^{-(N-\alpha)}(D(z))$ where D(z) is the impulse response of a strictly causal filter.

In general, there are two ways of computing the feedback filter coefficients for filter 1324. One method is the direct adaptation of the coefficients driven by the output error and the other method is computation of the coefficients from the estimated channel impulse response.

Illustratively, the first method is used because it is less complicated. In accordance with this method, the estimation error is given at time k by:

$$E_k=A_k+X'_{k-\Delta}D_{k-\Delta}-Y_{k-\Delta} \quad (15)$$

where $D_{k-\Delta}=[d_1...d_M]^*$ is the vector of filter coefficients for the causal filter at time k−Δ, $X_k=[X_{k-N}...X_{k-N-1}]^T$ is the vector of input samples to the feedback equalizer at time k, $A_k$ is the decoder decision (assumed to be error-free) and $Y_k$ is the output of the ZF equalizer. Minimization of the mean square error yields the result:

$$D_{opt}=R_{yy}^{-1}R_{ya} \quad (16)$$

where $R_{yy}=E[Y(k)Y(k)']$ and $R_{ya}=E[Y(k)A(k)']$. The LMS algorithm can then be used to determine D iteratively as follows:

$$E_k=A_k+X(k-\Delta)'D(k-\Delta-1)-Y_{k-\Delta} \quad (17)$$

and $$D_k=D_{k-1}-\mu E_{k-\Delta}X(k-\Delta) \quad (18)$$

where μ is a small positive constant.

The error term which drives the adaptive equalizers 1306 and 1324 is generated by delaying the input to the trellis decoder 1322 by a delay amount Δ by means of delay element 1318 and subtracting the result from the output of the trellis decoder 1322 by means of element 1320.

As with any DFE system, the circuits disclosed above are susceptible to error propagation problems. The predictor will not always work properly, and the tendency of errors to propagate is increased because the symbol estimator has a memory extending over several symbols. One partial solution is to interleave the symbols before the decoder. Interleaving/deinterleaving is an effective way of limiting the effect of wrong decisions out of the ML decoder. The type of interleaving which is required depends on the implementation of the coding. In a concatenated coding scheme with inner and outer coders, several levels of interleaving may be used. For example, if trellis coded modulation is used for the inner coder and a block code is used for the outer coder, two levels of interleaving may be used. Both interleavers should be optimized to use the error correction capability of the trellis and block codes to the fullest extent.

However, in some cases interleaving may not be sufficient. Another solution would be to operate two decoders in parallel, one using the interference rejection circuit, the other one using the conventional approach and select the output with the lowest error rate.

Although several illustrative embodiments of the invention have been discussed above, other modifications and changes will become immediately obvious to those skilled in the art. The scope of the invention is not intended to be limited by the illustrative examples, but is intended to be delineated by the claims set forth below.

What is claimed is:

1. A method for decoding a digitally-modulated data stream having a desired data symbol stream combined with quasi-cyclostationary interference, the method comprising the steps of:
    A. measuring values of the interference at a plurality of times;
    B. forming a predicted value of the interference at a selected time from interference values measured at times previous to the selected time;
    C. subtracting the predicted interference value from the interference value measured at the selected time to remove the interference and to generate an intermediate data stream;
    D. decoding the intermediate data stream to generate a decision data stream having a plurality of decision data values representing received data symbol values at a plurality of times; and
    E. forming an estimate of the quasi-cyclostationary interference occuring at times previous to the selected time from decision data stream values generated at times previous to the selected time and received signal values occurring at times previous to the selected time.

2. The method of claim 1 wherein step B comprises the steps of:
    B1. processing the quasi-cyclostationary interference occuring at times previous to the selected time through a prediction filter.

3. The method of claim 2 wherein step B1 comprises the steps of:
    B1A. choosing coefficients of the prediction filter to minimize an error criterion at the input of the decision device.

4. The method of claim 3 wherein tile decoding step D takes a predetermined time and step B1A comprises the step of:
    B1A1. updating the coefficients of the prediction filter iteratively to minimize a mean square error criterion taking into account the predetermined time.

5. The method of claim 3 wherein the desired data symbol stream has a frequency spectrum within a frequency band and the quasi-cyclostationary interference is an NTSC signal from a transmitter operating within the frequency band and wherein step B1A comprises the steps of:
    B1A2. choosing the coefficients of the prediction filter to correspond to samples of an NTSC field situated in a neighborhood of the current sample, on previous scan lines.

6. The method of claim 3 wherein the desired data symbol stream has a frequency spectrum within a frequency band and the quasi-cyclostationary interference is an NTSC signal from a transmitter operating within the frequency band and wherein step B1A comprises the steps of:
    B1A3. choosing the coefficients of the prediction filter to take into account the visual content of the NTSC signal.

7. A method for decoding a digitally-modulated data stream having a desired data symbol stream combined with quasi-cyclostationary interference, linear channel distortion and noise in a received signal, the method comprising the steps of:
    A. equalizing the received signal to remove intersymbol interference and to generate equalized signal values at a plurality of times;
    B. measuring values of the interference at the plurality of times;
    C. forming a predicted value of the interference at a selected time from interference values measured at times previous to the selected time;
    D. subtracting the predicted interference value from the equalized signal value at the selected time to remove the interference and to generate an intermediate data stream;
    E. decoding the intermediate data stream to generate a decision data stream having a plurality of decision data values representing received data symbol values at the plurality of times; and
    F. forming an estimate of the quasi-cyclostationary interference occuring at times previous to the selected time from decision data stream values generated at times previous to the selected time and equalized signal values occurring at times previous to the selected time.

8. The method of claim 7 wherein step A comprises the step of:
    A1. equalizing the received signal using a zero-forcing criterion.

9. The method of claim 8 wherein step A1 comprises the step of:
    A1A. equalizing the received signal with an equalizer having coefficients chosen to minimize an error criterion prior to decoding step E.

10. The method of claim 9 wherein step C comprises the steps of:
    C1. processing the quasi-cyclostationary interference through a prediction filter.

11. The method of claim 10 wherein step C1 comprises the step of:
    C1A. choosing the coefficients of the prediction filter to minimize an error criterion prior to decoding step E.

* * * * *